United States Patent [19]
Ward

[11] 3,872,669
[45] Mar. 25, 1975

[54] HYDROSTATIC TRANSMISSION CONTROL SYSTEM

[75] Inventor: Harold R. Ward, Marshall, Mich.

[73] Assignee: Eaton Corporation, Cleveland, Ohio

[22] Filed: Jan. 14, 1974

[21] Appl. No.: 433,086

Related U.S. Application Data

[63] Continuation-in-part of Ser. No. 285,729, Sept. 1, 1972, Pat. No. 3,795,107.

[52] U.S. Cl. .................... 60/395, 60/421, 60/490, 180/6.48
[51] Int. Cl. ............................................ F16h 39/46
[58] Field of Search ............ 60/395, 421, 427, 462, 60/465, 479, 484, 486; 180/6.48

[56] References Cited
UNITED STATES PATENTS

| | | | |
|---|---|---|---|
| 2,360,598 | 10/1944 | Tyler | 60/395 X |
| 2,846,849 | 8/1958 | Levetus et al. | 60/97 E UX |
| 3,085,403 | 4/1963 | Hamblin et al. | 60/97 E |
| 3,803,841 | 4/1974 | Erickson et al. | 60/421 |

FOREIGN PATENTS OR APPLICATIONS

| | | | |
|---|---|---|---|
| 1,023,033 | 3/1966 | United Kingdom | 60/420 |

*Primary Examiner*—Edgar W. Geoghegan
*Attorney, Agent, or Firm*—Teagno & Toddy

[57] ABSTRACT

An improved straight tracking and steering control system is utilized to control the operation of a pair of hydrostatic transmissions having variable displacement pump and motor units which drive tracks of a vehicle. The control system includes a pair of variable displacement control pumps which are associated with the hydrostatic transmission motor units. If one of the tracks of the vehicle should tend to accelerate relative to the other track of the vehicle, the hydrostatic transmission motor unit which drives the accelerating track will also increase the operating speed and output of the associated control pump to effect a variation in the displacement of only the pump unit of the accelerating hydrostatic transmission. Steering of the vehicle is effected by decreasing the displacement of one of the control pumps relative to the other control pump. For example to turn the vehicle toward the left, the displacement of the control pump associated with the right hand track and hydrostatic transmission is decreased. The relatively high output from the left hand control pump effects a reduction in the displacement of the pump unit of the left hand hydrostatic transmission. To enable the vehicle to make a sharp or spin turn, the steering control is effective to reverse the direction of operation of the pump unit without changing the displacement of the associated motor unit.

14 Claims, 6 Drawing Figures

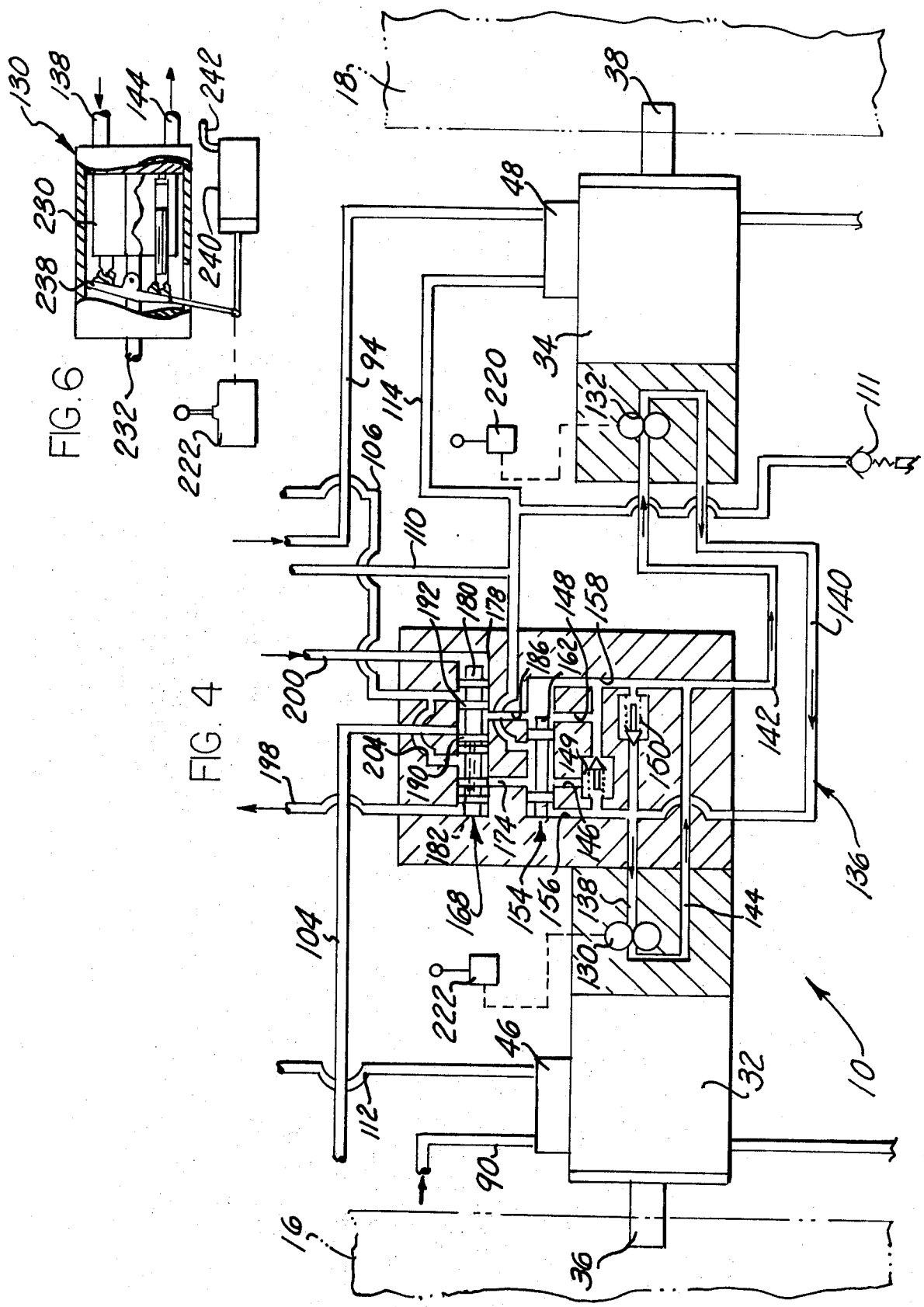

HYDROSTATIC TRANSMISSION CONTROL SYSTEM

This application is a continuation-in-part of copending application Ser. No. 285,729, filed Sept. 1, 1972, and entitled "Hydrostatic Transmission Control System." Now U.S. Pat. No. 3,795,107.

BACKGROUND OF THE INVENTION

The present invention relates to a new and improved apparatus for controlling the operation of a pair of hydrostatic transmissions and more specifically to improved straight tracking and/or steering controls.

A known straight tracking control system includes a pair of fixed displacement control pumps which are driven by hydrostatic transmission motor units. A variation of the speed of one of the motor units relative to the other motor unit increased the output of the associated pump. This increased fluid output effects actuation of a valve to direct working fluid from one of the motors to the other motor in an effort to equalize the output speeds of the motors in the manner described in U.S. Pat. No. 3,355,886. It should be noted that these straight tracking controls are ineffective to vary the displacement of the hydrostatic transmission pumps and motor units and cannot be used to steer a vehicle.

Another known control system (see U.S. Pat. No. 3,217,822) is effective to vary the displacement of a motor unit of an associated hydrostatic transmission to effect straight tracking and steering control functions. This control system includes a summing differential which is driven by the output shafts of a pair of hydrostatic transmission motor units. Upon an increase in the output speed of one of the motor units relative to the other, a single fixed displacement pump is driven by the summing differential to actuate a control valve and vary the displacement of the associated hydrostatic transmission motor unit. A steering lever is moved to operate the valve and effect a change in the displacement of one of the transmission motor units to steer the vehicle.

Another control system is described in U.S. Pat. No. 3,085,403 and includes a control or comparator valve which is exposed to the fluid pressure output of a pair of control pumps which are driven by hydrostatic transmission motor units. When the output speed of one of the hydrostatic transmission units exceeds the output speed of the other hydrostatic transmission unit, the comparator valve increases the quantity of working fluid directed to one of the motor units and decreases the quantity of working fluid directed to the other motor unit. A steering control valve is selectively operable to effect operation of the comparator valve to thereby steer the associated vehicle. This known control system cannot vary the displacement of the hydrostatic transmission pump and/or motor units to effect either straight tracking or steering functions.

SUMMARY OF THE PRESENT INVENTION

The present invention provides a straight tracking and/or steering control system which may be utilized in association with one or more hydrostatic transmissions. The straight tracking and/or steering control system may include a pair of variable displacement control pumps each of which is driven by a motor unit of an associated one of the hydrostatic transmissions.

When one of the hydrostatic transmissions tends to accelerate relative to the other, the fluid output from the associated control pump increases relative to the other control pump. This increase in fluid output is detected by a comparator valve which effects operation of only a pump actuator assembly to decrease the displacement of a variable displacement pump unit of the accelerating hydrostatic transmission. When the comparator valve is operated with the pump unit of the faster hydrostatic transmission fully swashed and the motor unit at least partially swashed, the displacement of the motor unit is maintained constant and the displacement of the pump unit is reduced to effect the desired reduction in the output speed of the hydrostatic transmission.

When the vehicle is to be turned, the displacement of one of the control pumps is varied so that the comparator valve senses an apparent overspeeding of one of the hydrostatic transmissions and reduces its output speed to turn the vehicle. For example to turn the vehicle toward the left, the displacement of the control pump associated with the right hand hydrostatic transmission is decreased. Decreasing displacement of the right hand control pump causes the comparator valve to detect that the left hand control pump has a higher fluid output than the right hand control pump. Upon detecting this condition, the comparator valve ports control fluid pressure to effect a reduction in the output speed of the left hand hydrostatic transmission.

If the vehicle is to be turned sharply with the pump and motor units both at least partially swashed, the displacement of the motor unit is maintained constant. The displacement of only the pump unit is decreased from a forward operating condition in which the fluid output from the pump causes the motor unit to drive the vehicle forwardly. After having been reduced to substantially zero effective displacement, the pump unit is actuated to a reverse operated condition to reverse the direction of fluid flow from the pump unit to the motor unit. This results in a reversal of the direction of operation of the motor unit and resulting sharp turning of the vehicle.

The displacement of the motor unit is maintained constant as the pump unit is actuated from the forward operating condition to the reverse operating condition. Therefore, if the pump unit is actuated from a forward operating condition in which the pump unit has a given displacement to a reverse operated condition in which the pump unit has the same displacement, the vehicle will move through a spin turn about its central axis. If the motor unit was deswashed as the pump unit was changed from a forward operating condition to a reverse operating condition, in the manner disclosed in copending application Ser. No. 285,729, a spin turn would not be achieved. This is because the output speed of the hydrostatic transmission operating in the reverse direction would not be equal to the output speed of the hydrostatic transmission operating in the forward direction.

Accordingly, it is an object of this invention to provide a new and improved control system for controlling the operation of a hydrostatic transmission in such a manner as to enable a pump unit to be operated between forward and reverse operating conditions while maintaining the displacement of a motor unit substantially constant.

Another object of this invention is to provide a new and improved control system for controlling the operation of one or more hydrostatic transmissions having variable displacement pump and motor units and wherein the control system includes a pump controller to actuate the pump unit through a range of operating displacements, a motor controller to operate a motor unit between maximum and minimum displacement conditions, and an arrangement for effecting operation of the pump controller to vary the displacement of the pump unit without effecting operation of the motor controller when the motor unit has a displacement which is less than its maximum displacement.

Another object of this invention is to provide a new and improved straight tracking control system which includes a pair of control pumps and a pair of motors which are operable to vary the displacement of only the pump units of a pair of hydrostatic transmissions in response to a variation in a fluid output characteristic of one of the control pumps relative to a fluid output characteristic of the other control pump.

BRIEF DESCRIPTION OF THE DRAWINGS

The foregoing and other objects and features of the present invention will become more apparent upon a consideration of the following description taken in connection with the accompanying drawings wherein:

FIG. 4 is a schematic illustration, similar to FIG. 2, depicting the control apparatus with the hydrostatic transmission motor units operating in the reverse direction and with the left hand hydrostatic transmission motor unit operating at a greater speed than the right hand hydrostatic transmission motor unit;

FIG. 6 is an enlarged schematic illustration depicting one control pump of a pair of control pumps utilized in the control system of FIGS. 2–5.

DESCRIPTION OF ONE EMBODIMENT OF THE INVENTION

General Arrangement

Figure 1:
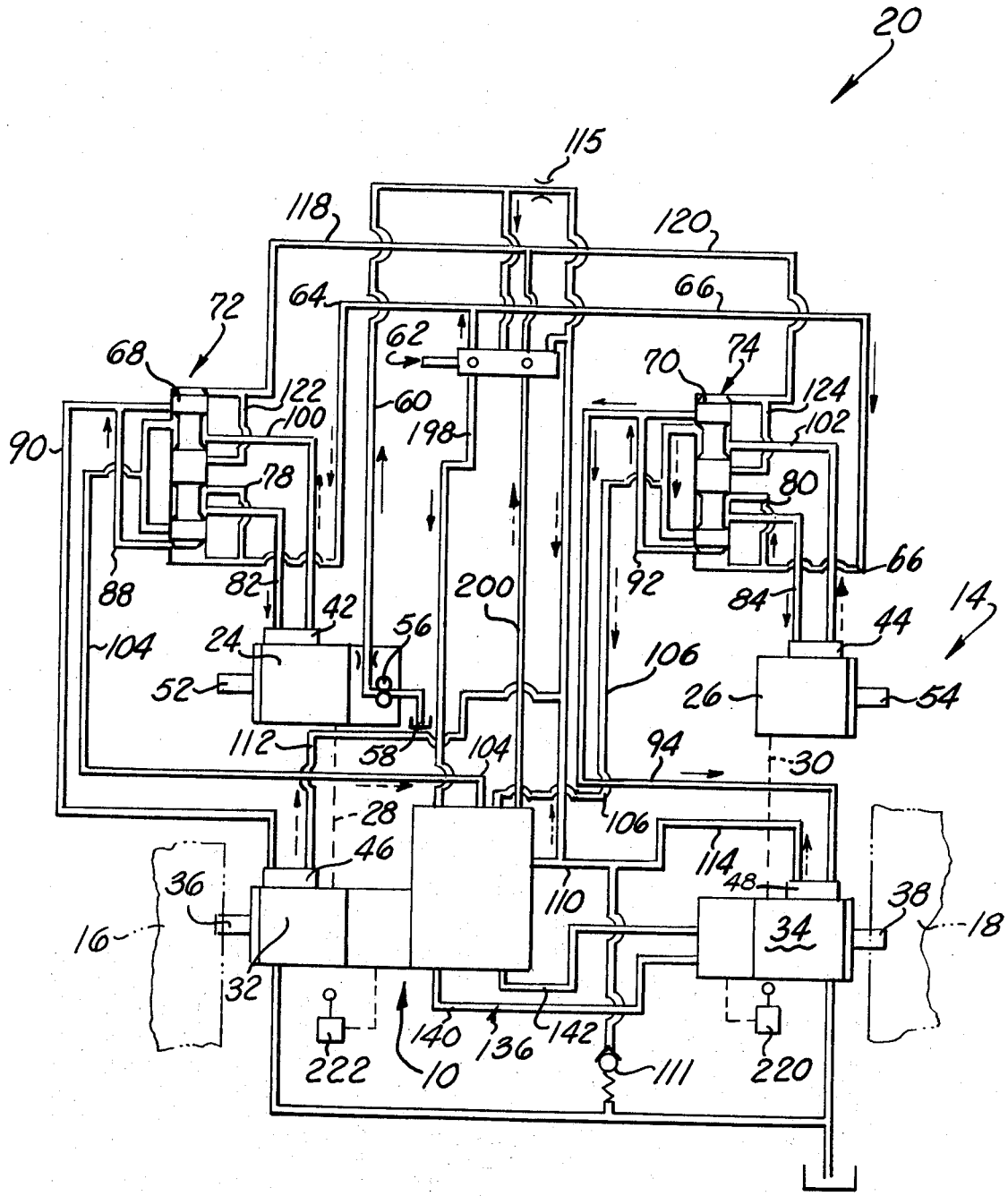
FIG. 1 is a schematic illustration depicting the relationship between pump and motor units of a pair of hydrostatic transmissions and a control system constructed in accordance with the present invention.

An improved steering and/or straight tracking control system 10 constructed in accordance with the present invention is illustrated in FIG. 1 in association with a pair of hydrostatic transmissions 12 and 14 which are utilized to drive left and right hand tracks 16 and 18 of a vehicle 20. The hydrostatic transmissions 12 and 14 are of known construction and include variable displacement pump units 24 and 26 which supply fluid under pressure through hydrostatic loops, indicated schematically 28 and 30, to variable displacement motor units 32 and 34 having rotatable output shafts 36 and 38 which are connected with the tracks 16 and 18. Double acting pump controller or actuator assemblies 42 and 44 are operable to increase the effective displacement of the pump units 24 and 26 through a range of operating displacements to increase the rate at which fluid is conducted through the hydrostatic loops 28 and 30 and the speed of rotation of the motor output shafts 36 and 38. After the pumps units 24 and 26 have been fully swashed, double acting motor controller or actuator assemblies 46 and 48 are operated to deswash or decrease the displacement of the motor units 32 and 34 through a range of operating displacements to effect a further increase in the speed at which the output shafts 36 and 38 are rotated.

To initiate operation of the vehicle 20, an engine or other prime mover (not shown) is started to drive input shafts 52 and 54 of the pump units 24 and 26. At this time the pump units 24 and 26 have a minimum displacement and are ineffective to supply working fluid through the hydrostatic loops 28 and 30 to the motor units 32 and 34. The motor units 32 and 34 are initially in a maximum displacement condition. A charge pump 56 supplies fluid under pressure from a reservoir 58 through a conduit 60 to a speed control valve 62.

Forward movement of the vehicle 20 is initiated by operating the speed control valve 62. Forward operation of the speed control valve 62 ports high pressure control fluid through conduits 64 and 66 to move slidable valve spools 68 and 70 of selector or rectifying valves 72 and 74 to the forward actuated positions of FIG. 1. This enables control fluid to flow from conduits 64 and 66, through conduits 78 and 80, selector valves 72 and 74, and conduits 82 and 84 to the pump actuator or controller assemblies 42 and 44. The fluid pressure causes the pump actuator assemblies 42 and 44 to move the swashplates of the pump units 24 and 26 to a forward operating condition. In addition, the high pressure control fluid is conducted from the selector valves 72 and 74 to the motor actuator assemblies 46 and 48 through conduits 88, 90, 92 and 94 (this fluid flow is indicated by the solid line arrows in FIG. 1). The speed control valve 62 is of the pressure regulator type disclosed in U.S. Pat. No. 3,540,220 and enables the fluid pressure conducted to the pump and motor actuator assemblies 42, 44, 46 and 48 to increase as a function of the extent to which the speed control valve 62 is operated.

Assuming that the speed control valve 62 is operated to a sufficient extent, the control fluid pressure conducted to the pump actuator assemblies 42 and 44 activates them to move the swashplates of the pump units 24 and 26 to their maximum displacement conditions against the influence of suitable biasing springs. Thereafter, a continued rise in the fluid pressure conducted from the speed control valve 62 results in the motor actuator assemblies 46 and 48 being operated against the influence of biasing springs which are somewhat stiffer than the biasing springs in the pump actuator assemblies 42 and 44. Operation of the motor actuator assemblies 46 and 48 reduces the effective displacement of the motor units 32 and 34.

The pump and motor actuator assemblies 42, 44, 46 and 48 are of the double acting type and fluid is exhausted from them as they are operated under the influence of control fluid from the speed control valve 62. Thus, exhaust fluid (indicated by dashed arrows in FIG. 1) is conducted from the pump actuator assemblies 42 and 44 through conduits 100 and 102 to the actuated selector valves 72 and 74 which port the exhaust fluid to conduits 104 and 106. The conduits 104 and 106 are connected with a conduit 110 which is connected with drain through a check valve 111 set to maintain a predetermined pressure in the conduit 110, for example a pressure of 30 p.s.i. The motor actuator assemblies 46 and 48 are also of the double acting type so that their operation causes fluid to be exhausted through conduits 112 and 114 to the conduits 104 and 106 leading to the conduit 110. The conduit 110 is connected with supply through an orifice 115 (FIG. 1).

When the vehicle 20 is to be moved in a reverse direction, the speed control valve 62 is actuated to port control fluid to the selector or rectifying valves 72 and 74 through conduits 118 and 120. This fluid causes the valve spools 68 and 70 to move downwardly (as viewed in FIG. 1) to enable a high pressure control fluid to flow from branch conduits 122 and 124 through the selector valves to the conduits 100 and 102 leading to the pump actuator assemblies 42 and 44 to thereby effect operation of the actuator assemblies to operate the pump units 24 and 26 to their reverse operating conditions. As is well known, when the swashplates of the pump units 24 and 26 are pivoted in one direction from a minimum displacement condition, the pump units transmit working fluid to the circuits 28 and 30 to operate the motor units 32 and 34 to drive the vehicle 20 forwardly. Similarly upon movement of the pump swashplates in the opposite direction from the minimum displacement condition, the flow of working fluid from pump units into the circuits is reversed to operate the motor units to drive the vehicle 20 in the reverse direction.

In addition, this high pressure control fluid is conducted from the selector valves 72 and 74 to the motor actuator assemblies 46 and 48 by the conduits 90 and 94 to effect operation of the motor actuator assemblies 46 and 48 after the pump actuator assemblies 42 and 44 have been fully operated. During reverse operation of the pump and motor actuator assemblies 42, 44, 46 and 48, fluid is exhausted to the conduits 104 and 106 leading to the control system 10 in a manner similar to that previously explained in connection with with forward operation of the actuator assemblies.

The construction of the pump and motor actuator assemblies 42, 44, 46 and 48 and their interrelationship with the selector valves 72 and 74 and speed control valve 62 is generally similar to that described in U.S. application Ser. No. 248,685, filed Apr. 28, 1972, by Edward J. Bojas and Harold R. Ward and entitled "Hydrostatic Transmission Drive System." Now U.S. Pat. No. 3,795,109. However, it should be noted that the motor actuator assemblies 46 and 48 are double acting rather than being single acting as described in the Bojas and Ward application. Therefore, the predetermined pressure in the conduit 110, due to the check valve 111, is effective to bias the actuator assemblies 46 and 48 toward an initial position in which the motor units 32 and 34 have a maximum displacement. In addition, the selector valves 72 and 74 connect the pump and motor actuator assemblies 42, 44, 46 and 48 with the conduits 104 and 106 in a manner which is somewhat different than in the forementioned application.

Straight Tracking

The straight tracking and/or steering control system 10 is operable to prevent undesired turning of the vehicle 20 from a straight path during either forward or reverse operation of the vehicle. In addition, the control system 10 may be selectively actuated to effect a desired turning of the vehicle toward either the right or the left. Although the control system 10 is advantageously used as a combined straight tracking and steering control system, it is contemplated that under certain circumstances the control system 10 may be used as only a straight tracking control to prevent undesired turning of the vehicle. It is also contemplated that the control system 10 may be used with only one hydrostatic transmission and one hydrostatic transmission and may be used with hydrostatic transmissions operated for purposes other than driving vehicles.

If the rotational speed of one of the motor output shafts 36 or 38 exceeds the speed of the other output shaft during movement of the vehicle 20 along a straight path, the control system 10 varies the displacement of only the pump unit of the faster hydrostatic transmission to equalize the rotational speeds of the output shafts 36 and 38. This enables the vehicle 20 to follow a straight path without excessive deviation due to the variations in the traction encountered by one of the tracks 16 or 18. The control system 10 accomplishes this by producing a hydraulic signal of a magnitude which is a function of the difference in the output speeds of the motor units 32 and 34. This hydraulic signal is utilized to effect a slowing of the speed of the faster motor unit 32 or 34 to match the slower motor unit.

The control system 10 includes a pair of variable displacement control pumps 130 and 132. The pump 130 is driven by the motor unit 32 at a speed which is directly proportional to the rotational speed of the output shaft 36. Similarly, the control pump 132 is driven by the motor unit 34 at a speed which is directly proportional to the rotational speed of the output shaft 38.

The two control pumps 130 and 132 are interconnected by a fluid circuit 136 so that the fluid discharged from the pump 130 flows through conduits 138 and 140 to the control pump 132 and fluid from the control pump 132 flows through conduits 142 and 144 to the control pump 130 to form a hydraulic loop between the two control pumps 130 and 132. Fluid at a pressure, determined by the setting of the check valve 111, is supplied from the conduit 110 to the hydraulic loop between the control pumps 130 and 132 through passages 146 and 148 to maintain the fluid circuit 136 charged. A pair of relief valves 149 and 150 prevent the formation of excessive pressure in the fluid circuit 136.

When the vehicle 20 is proceeding along a straight path and the two output shafts 36 and 38 are rotating at the same speed, the pumps 130 and 132 have equal displacements. The fluid output from the pump 130 to the conduits 138 and 140 is then equal to the fluid output from the pump 132 to the conduits 142 and 144. Therefore, the rate of fluid flow and the pressure in the conduits 138 and 140 is equal to the rate of fluid flow and pressure in the conduits 142 and 144. Since the fluid pressure in both sides of the circuit 136 was initially equal, operation of the two equal displacement pumps 130 and 132 at the same speed results in the pressure in the circuit remaining at substantially constant initial pressure even though the pumps are effective to provide a substantial flow of fluid through the circuit. This is because the fluid intake and discharge rate of the pump 130 is equal to the fluid intake and discharge rate of the pump 132.

If one of the tracks 16 or 18 should accelerate relative to the other track, due to differences in traction or other causes, the speed of rotation of one of the output shafts 36 or 38 will increase relative to the other output shaft. For example, if the vehicle 20 is proceeding straight ahead and track 16 encounters a slippery or low traction condition, the reduced resistance to movement enables the motor unit 32 to accelerate the output shaft 36 and track 16 relative to the output shaft 38 and track 18 which are driven by the motor unit 34. Since the control pump 130 is driven by the motor unit 32 at a speed which is directly proportional to the rotational speed of the output shaft 36, the increase in the speed at which the motor unit 32 drives the output shaft 36 results in the pump 130 being driven at a higher speed than the pump 132. Of course, this will result in the pump 130 discharging fluid into the conduits 138 and 140 at a greater rate than that which the pump 132 takes the fluid and discharges it into the conduits 142 and 144.

The increased flow rate from the pump 130 results in a higher pressure being present in the conduits 138 and 140 than is present in the conduits 142 and 144. The amount by which the fluid pressure in the conduits 138 and 140 exceeds the fluid pressure in the conduits 142 and 144 is a direct function of the amount by which the rotational speed of the output shaft 36 and operating speed of the pump 130 exceeds the rotational speed of the output shaft 38 and operating speed of the pump 132.

The fluid pressure in the conduits 138 and 144 is monitored by a comparator valve 154 which is connected in fluid communication with the conduits 138 and 140 by conduit 156 and is connected in fluid communication with the conduits 142 and 144 by conduit 158. When the discharge rate of the pump 130 exceeds the discharge rate of the pump 132 and a relatively high pressure is present in the conduits 138 and 140, this high pressure is transmitted to the comparator valve 154 and moves a valve spool 162 to the right-hand actuated position of FIG. 2. Similarly, when the discharge rate of the pump 132 exceeds the discharge rate of the pump 130, the relatively high pressure in the conduits 142 and 144 is transmitted to the comparator valve 154 by the conduit 158 to shift the valve spool 162 to the left-hand actuated position shown in FIG. 3.

The comparator valve 154 ports control fluid to either the conduit 104 or the conduit 106 to effect a reduction in the output speed of one of the associated hydrostatic transmissions 12 or 14. Thus as the track 16 begins to accelerate relative to the track 18, the increased fluid flow from the pump 130 increases the pressure in the conduits 138 and 156 and shifts the valve spool 162 to the actuated position of FIG. 2. Fluid under pressure is then ported from the comparator valve 154 to a directional valve 168 which in turn ports fluid to the conduit 104 leading to only the pump actuator assembly 42 through the selector valve 72.

It should be noted that if the motor actuator assembly 46 had previously been operated to move the swashplate of the motor 32 from its maximum displacement position toward its minimum displacement position, the increased fluid pressure in the conduit 104 would not effect movement of the motor swashplate back toward its maximum displacement condition. Therefore, the displacement of the motor unit 32 remains constant as the displacement of the pump unit 24 is reduced.

The conduit 104 transmits the increased fluid pressure to the pump actuator assembly 42 through the selector valve 72 and conduit 100 (see FIG. 1) to effect operation of the pump actuator assembly 42 to move the swashplate of the pump unit 24 toward its minimum displacement condition. Of course, this would effect a reduction in the fluid output from the pump unit 24. The reduced fluid output from the pump unit 24 reduces the operating speed for the motor unit 32 even though the displacement of the motor unit remains constant.

If when the vehicle 20 is proceeding along a straight path the track 18 encounters a slippery or low traction condition so that the right hand motor unit 34 and output shaft 38 are accelerated relative to the motor unit 32 and output shaft 36, the operating speed of the pump 132 will exceed the operating speed of the pump. This results in an increase in the fluid pressure in the conduits 142 and 144 so that the comparator valve spool 162 is moved to the left hand actuated position of FIG. 3. Fluid is then ported from the direction valve 168 to the conduit 106 leading to the pump actuator assembly 44 through the selector valve 74. It should be noted that the conduit 106 is not connected with the motor actuator assembly 48. Therefore, only the pump actuator assembly 44 is operated in response to a variation in the fluid pressure in the conduit 106.

The increased fluid pressure in the conduit 106 effects operation of the double acting pump actuator assembly 44 in the manner previously explained in connection with the hydrostatic transmission 12 to reduce the rotational speed of the output shaft 38. Thus, the increased fluid pressure in the conduit 106 is transmitted through the selector valve 74 and conduit 102 to the pump actuator assembly 44 (FIG. 1). The fluid pressure in the line 106 effects operation of the pump actuator assembly 44 to move the swashplate of the pump unit 26 from its operating displacement position toward its minimum displacement position. Although the displacement of the motor unit 34 remains constant, the decrease in the displacement of the pump unit 26 results in a decreased flow of working fluid to the motor unit and a decrease in the speed of rotation of the output shaft 38.

The comparator and direction valves 154 and 168 cooperate to port fluid to the proper one of the two conduits 104 or 106 depending upon which of the output shafts 36 or 38 is being rotated at the higher speed. Thus, when the rotational speed of the output shaft 36 and operating speed of the pump 130 is exceeding the rotational speed of the shaft 38 and the operating speed of the pump 32, the valve spool 162 is moved to the right-hand actuated position shown in FIG. 2 to connect the conduit 156 in fluid communication with a passage 174 and chamber 178 in which a directional valve spool 180 is disposed. The control fluid from the conduit 174 flows through a central passage 182 within the valve spool 180 to the conduit 104.

Figure 3:
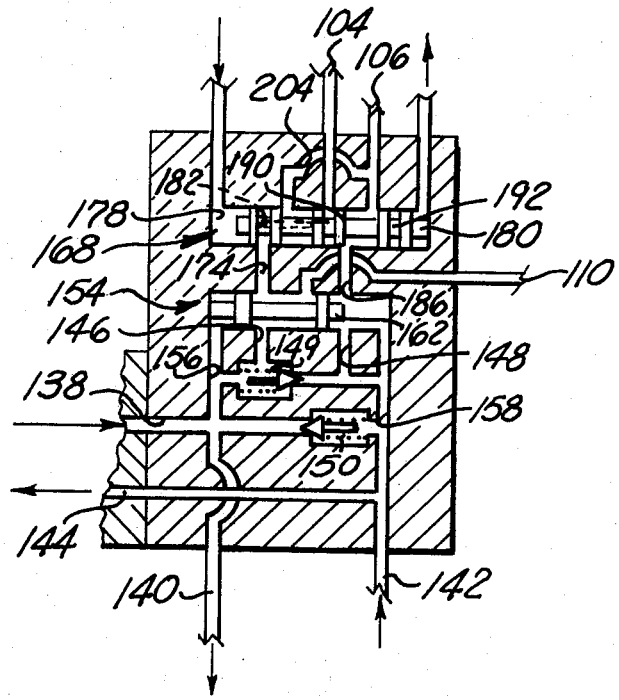
FIG. 3 is a fragmentary schematic illustration depicting a portion of the control system of FIG. 2 with the right hand hydrostatic transmission motor unit operating at a greater speed than the left hand hydrostatic transmission motor unit.

When the output speed of the shaft 38 and operational speed of the motor 132 exceeds the output speed of the shaft 36 and operational speed of the motor 130, the valve spool 162 in the comparator 154 is shifted to the left-hand actuated position shown in FIG. 3 under the influence of pressure conducted through the conduit 158. Fluid pressure is then transmitted to the directional valve 168 through a passage 186. The passage 186 is connected in fluid communication with the passage 106 by the annular space between adjacent lands 190 and 192 on the directional valve spool 180.

When the vehicle 20 is being operated in the reverse direction, the direction of rotation of the output shafts 36 and 38 and operation of the pumps 130 and 132 is reversed from that of the forward direction. Thus, during forward operation of the vehicle 20 fluid from the pump 130 flows through the conduits 138 and 140 to the pump 132. However, during reverse operation of the vehicle 20 fluid from the pump 130 flows through the conduits 144 and 142 to the pump 132. During this reversal of fluid flow in the circuit 136, the directional valve 168 is shifted from the position shown in FIG. 2 to the position shown in FIG. 4 upon operation of the speed control valve 62 (see FIG. 1) from a forward actuated condition to a reverse actuated condition. To enable high pressure fluid from the comparator valve 154 to effect a reduction in the output speed of the hydrostatic transmission 12 when the operating speed of pump 130 exceeds the operating speed of pump 132 during reverse operation, the directional valve 168 is actuated to port high pressure fluid from the pump 130 and comparator valve 154 to the conduit 104 and the pump actuator assembly 42 for the pump unit 24. When the operating speed of the pump 132 exceeds the operating speed of the pump 130, high pressure fluid is ported from the comparator valve 154 to the directional valve 168 and conduit 106 (see FIG. 5).

Figure 2:
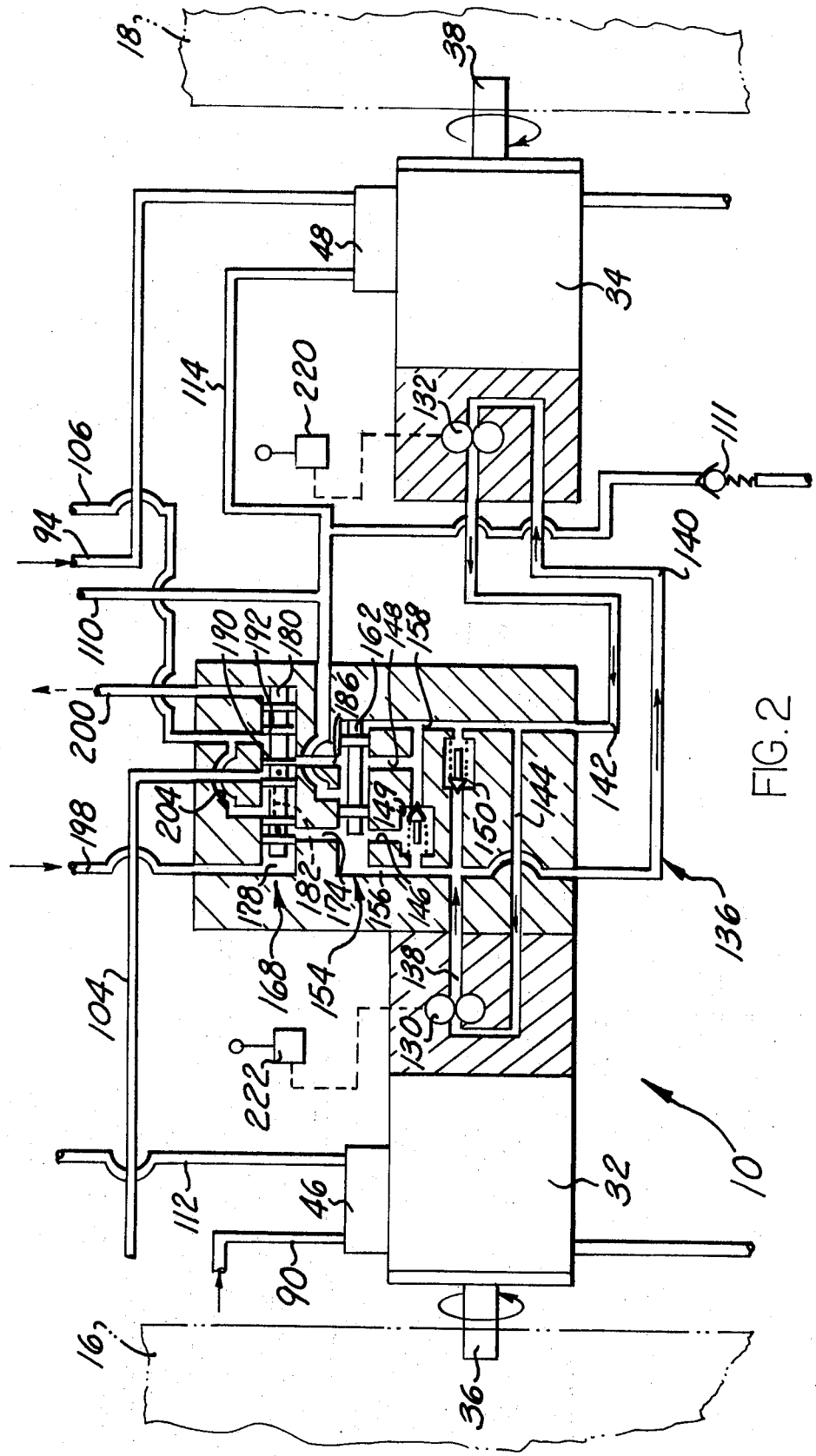
FIG. 2 is an enlarged schematic illustration depicting the relationship between the control system and the motor units of the two hydrostatic transmissions of FIG. 1, the control system being shown in a forward operated condition with a left hand hydrostatic transmission motor unit operating at a greater speed than a right hand hydrostatic transmission motor unit.

The directional valve spool 180 is shifted from the position shown in FIG. 2 to the position shown in FIG. 4 upon operation of the speed control valve 62 (see FIG. 1) from a forward actuated condition to a reverse actuated condition. Thus, when the vehicle 20 is moving in a forward direction high pressure fluid is conducted through a conduit 198 to one end of the directional valve chamber 178 while the other end of the valve chamber is connected with drain through a conduit 200 (see FIG. 2). When the speed control valve 62 is actuated to effect reverse operation of the vehicle 20, high pressure fluid is conducted through the conduit 200 to the direction valve chamber 178 and the conduit 198 is connected with drain. This results in the valve spool 180 being shifted to the reverse actuated position shown in FIG. 4.

When the valve spool 180 is in the reverse actuated position and the rotational speed of the output shaft 36 and operational speed of the pump 130 exceeds the rotational speed of the output shaft 38 and operational speed of the pump 132, the relatively high fluid pressure in the conduits 144 and 158 shifts the comparator valve spool 162 to the left-hand operated position of FIG. 4. High pressure fluid is then conducted from the conduit 158 through the passage 186 to the directional valve chamber 178. The high pressure fluid passes between the lands 190 and 192 and enters the passage 104 to effect actuation of the pump actuator assembly 42 in the manner previously explained in connection with forward operation of the hydrostatic transmission 12.

Figure 5:
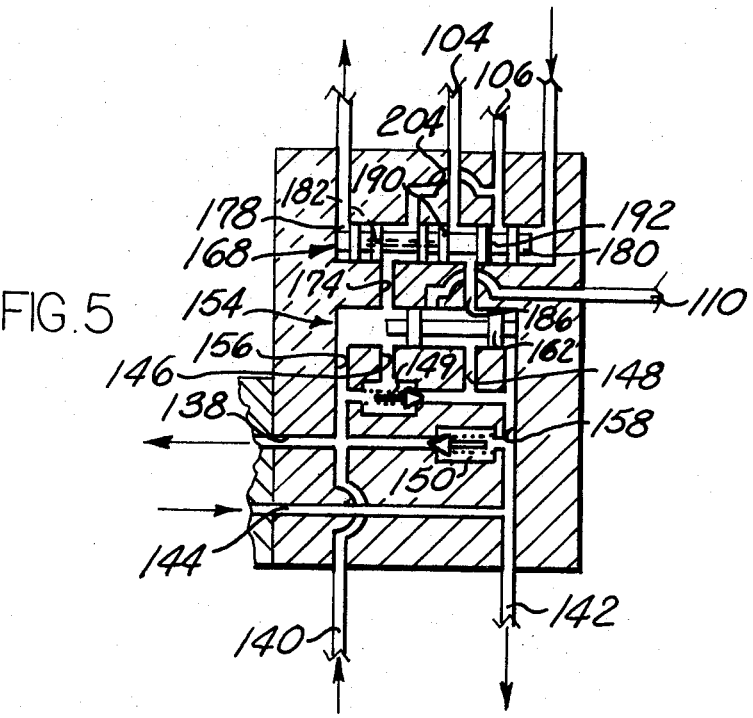
FIG. 5 (on sheet 3 of the drawings) is a schematic illustration, similar to FIG. 3, depicting the condition of the control apparatus when the hydrostatic transmission motor units are operating in the reverse direction with the right hand hydrostatic motor unit operating at a higher speed than the left hand hydrostatic motor unit.

When the rotational speed of the output shaft 38 and operational speed of the pump 132 exceeds the rotational speed of the output shaft 36 and operational speed of the pump 130 as the vehicle is moving in the reverse direction, the relatively high fluid pressure in the conduit 140 is transmitted to the comparator valve 154 to move the valve spool 162 to the right-hand actuated position of FIG. 5. The relatively high fluid pressure in the conduit 156 is transmitted through the passage 174 to the directional valve chamber 178 (FIG. 5) and to a branch passage 204 leading to the exhaust conduit 106. The increase in fluid pressure in the conduit 106 effects actuation of the pump actuator assembly 44 to reduce the rotational speed of the output shaft 38 in the manner previously explained in connection with the forward operation of the hydrostatic transmission 14. It should be noted that during both forward and reverse operation of the hydrostatic transmissions 12 and 14, the passages 104 and 106 function as exhaust passages for the double acting pump actuator assemblies 42 and 44. This is because the valve spools 68 and 70 and the selector valves 72 and 74 are shifted to maintain the conduits 104 and 106 as exhaust conduits during forward and reverse operation of the vehicle 20.

Steering Control

The pumps 130 and 132 are of the variable displacement type to enable the control system 10 to be utilized for both straight tracking and steering control functions. Steering of the vehicle 20 is accomplished by changing the displacement of one of the two control pumps 130 and 132 so that the comparator valve 154 senses an apparent difference in the rotational speeds of the output shafts 36 and 38 even though the shafts are being rotated at the same speed. This results in a correction signal being applied until one of the hydrostatic transmissions 12 or 14 change the rotational speed of one of the shafts 36 or 38 to cause a turning of the vehicle.

When the vehicle is to be turned, the displacement of one of the control pumps 130 or 132 is reduced. Since the pumps 130 and 132 are operating at the same speed, the reduction in displacement of one of the pumps prevents it from pumping the volume of fluid discharged from the other pump. This causes a pressure rise to occur in one of the conduits 140 or 142 of the fluid circuit 136. The pressure rise enables the comparator valve 154 to port fluid to reduce the rotational speed of the output shaft 36 or 38 associated with the pump 130 or 132 having the larger displacement.

If the vehicle 20 is to be turned toward the left while moving forward, a suitable control 220 is actuated to reduce the displacement of the right hand control pump 132 (see FIG. 2). Since the pumps 130 and 132 are both of the positive displacement type and are both being driven at the same speed, fluid is discharged from the pump 130 at a greater rate than which fluid is accepted by and discharged from the pump 132 which now has a reduced displacement. This results in an increase in the fluid pressure in the conduits 138 and 140. This increased fluid pressure in the conduit 140 causes the valve spool 162 of the comparator valve 154 to be moved to the right-hand actuated position (FIG. 2). Fluid pressure is then transmitted by the directional valve 168 to the conduit 104 to reduce the rotational speed of the output shaft 36 in the manner previously explained in connection with straight tracking functions. Of course, the decrease in rotation speed of the output shaft 36 results in a decrease in the speed at which the left-hand track 16 is driven so that the vehicle 20 turns toward the left.

If the vehicle 20 is to be turned toward the right, the displacement of the left hand-control pump 130 is reduced by actuating a suitable control 222. The control pump 132 will now have a larger displacement than the control pump 130. Therefore, the fluid pressure in the conduit 142 will tend to build up and move the valve spool 162 of the comparator valve 154 to the left-hand actuated position of FIG. 3. This results in the pressure being transmitted through the directional valve 168 to the exhaust conduit 106 to operate the pump actuator assembly 44 to reduce the output speed of the hydrostatic transmission 14 in the manner previously explained.

During reverse operation of the vehicle 20, the steering controls 220 and 222 are actuated to effect turning of the vehicle in the same manner as during forward operation of the vehicle. For example if the vehicle is to be turned toward the left while moving backward, the displacement of the control pump 132 is reduced. The resulting pressure buildup in the line 142 is transmitted through the comparator and directional valves 154 and 168 to the conduit 104 to effect a reduction in the rotational speed of the output shaft 36. Similarly, the displacement of the control pump 130 is reduced to effect a turning of the vehicle 20 toward the right as the vehicle is moving in the reverse direction.

Upon actuation of one of the steering controls 220 or 222, the output speed of one of the tracks 16 or 18 is decreased by a percentage which is proportional to the percentage by which the displacement of one of the pumps 130 or 132 is decreased. Thus, if the displacement of the control pump 130 is decreased by 50 percent due to actuation of the controls 222, a 50 percent reduction will be effected in the rotational speed of the output shaft 38 and speed at which the track 18 is driven by the hydrostatic transmission 14. A spin turn is effected by going past neutral to full swash in the opposite direction.

In accordance with a feature of the present invention, the steering controls 220 and 222 can be actuated to cause the vehicle 20 to make an extremely sharp or spin turn. To effect a spin turn, the pump unit connected to one of the tracks 16 or 18 is operated from a forward operating condition in which the pump unit has a given displacement to a reverse operating condition in which the pump unit has the same displacement. The displacement of the associated motor unit is maintained constant. Therefore, upon a reversal in the operating condition of the pump unit, the associated track is driven in the reverse direction at the same speed in which the other track is driven in a forward direction to effect a spin turning of the vehicle. Of course, if somewhat less than a spin turn is desired, the displacement of the pump in the reverse operating condition is reduced.

Assuming that the vehicle 20 is preceding in a straight forward direction with the pump units 24 and 26 fully swashed and the motor units 32 and 34 fully swashed, a spin turn toward the right is obtained by actuating the control 222 to effect a decrease in the displacement of the left-hand control pump 130. This causes fluid under pressure to be conducted through the conduit 106 and selector valve 74 to the pump controller or actuator assembly 44. The pump actuator assembly 44 is operated to reduce the displacement of the pump unit 26 from its maximum displacement in a forward operating condition to its neutral or minimum displacement condition. The fluid pressure is sufficient to cause the actuator assembly 44 to move the swashplate of the pump unit 26 to its maximum displacement reverse operating condition.

The reversal in the operating conditions of the pump unit 26 causes a reversal in the flow of fluid through the circuit 30 to reverse the direction of operation of the motor unit 34. Since the displacement of the motor unit 34 has remained at the same displacement which both the motor units 32 and 34 had before the spin turn was initiated, the track 18 is driven in a reverse direction at the same speed as in which the track 18 was driven in the forward direction. Of course this results in a spin turn toward the right.

Actuation of the control valve 220 to effect a spin turn toward the left causes a reversal in the operating condition of the pump unit 26 in the same manner as explained in connection with the pump unit 24. The displacement of the motor unit 34 is maintained constant so that the track 18 is driven in a reverse direction at the same speed as in which the track 18 was driven in the forward direction.

The control pumps 130 and 132 are the positive acting variable displacement type. Although any type of control pump having these characteristics could be utilized, in one specific embodiment of the invention the control pumps 130 and 132 were of the axial piston type (FIG. 6). The control pump 130 includes a barrel or body 230 which is rotated by an input shaft 232. The shaft 232 is connected with and driven by motor unit 32 of the hydrostatic transmission 12. Upon rotation of the input shaft 232 and barrel 230, pistons 236 are reciprocated axially relative to the barrel by a movable swashplate 238.

A piston and cylinder assembly 240 is connected with the swashplate 238. Fluid pressure conducted from the conduit 110 by a conduit 242 biases the piston and cylinder assembly 240 to a position in which the displacement of the pump 130 is equal to the displacement of the pump 132. The controls 222 are operable to actuate the piston and cylinder assembly and reduce the displacement of the pump 130 against the influence of the fluid pressure bias.

During forward rotation of the shaft 232, reciprocations of the pistons 236 cause fluid to be drawn into working chambers in the barrel 230 through the conduit 138 and to be discharged from the working chambers through a conduit 144. Of course during reverse rotation of the input shaft 232, the fluid is drawn in through the conduit 144 and discharged through the conduit 138.

To effect a reduction in the displacement of the control pump 130, the controls 222 are operated to effect movement of the swashplate 238 in a counterclockwise direction from the position shown in FIG. 6 against the influence of the fluid pressure bias on the piston and cylinder assembly 240. Counterclockwise movement of the swashplate toward a position in which it extends perpendicular to the axis of rotation of the shaft 232 reduces the effective displacement of the control pump 130 in a known manner. Reducing the displacement of the pump 130 decreases the rate at which fluid can be accepted by the pump through the conduit 138 and the rate at which the fluid is discharged from the pump to the conduit 144. It should be noted that the pumps 130 and 132 are the positive action type so the volume of the fluid flow is a function of operation speed and displacement.

In view of the foregoing description it can be seen that the straight tracking and/or steering control system 10 includes a pair of identical control pumps 130 and 132 which provide hydraulic signals to control straight tracking of the vehicle 20. In addition, the displacement of the pumps 130 and 132 can be varied to effect steering of the vehicle. During both straight tracking and steering control operations, only the pump actuator assemblies 42 and 44 for the pump units 24 and 26 of the hydrostatic transmissions are operated to vary the rotational speed of the output shaft of that hydrostatic transmission. While it is believed to be advantageous to use the control system 10 as a combined steering and straight tracking control system, it should be understood that the control system could be utilized to perform only straight tracking functions or only steering functions if desired.

Since the displacement of a motor unit is maintained constant during a reversal of the operating condition of an associated pump unit, the vehicle 20 can make very sharp or spin turns when the motor units have displacements which are less than their maximum displacements. If the straight tracking and/or steering controls were operable to upswash a motor unit to its maximum displacement condition without again deswashing the motor unit, the vehicle 20 could not be moved through a spin turn while moving forwardly with both the pump and motor units swashed. By maintaining the displacement of the motor units constant and deswashing only one pump unit, the vehicle 20 can be moved through spin turn.

Having described one specific preferred embodiment of the invention, the following is claimed:

1. An apparatus comprising first and second hydrostatic transmissions for transmitting drive forces to support surface engaging drive elements of a vehicle, said first and second hydrostatic transmissions each including a reversible variable displacement pump unit having forward and reverse operating conditions, a variable displacement motor unit, and means for conducting fluid between said pump and motor units, pump controller means for effecting operation of said pump units between the forward and reverse operating conditions and for varying the effective displacements of said pump units, motor controller means for varying the effective displacements of said motor units between an initial operating condition in which said motor units have relatively large effective displacements and a second operating condition in which said motor units have relatively small effective displacements, speed and direction control means for effecting operation of said pump controller means to operate said pump units between the forward and reverse operating conditions and for effecting operation of said pump and motor controller means to vary the displacements of said pump and motor units and the speeds at which said first and second hydrostatic transmissions are effective to drive the support surface engaging drive elements of the vehicle, and steering control means for effecting operation of only said pump controller means to operate one of said pump units between the forward and reverse operating conditions while maintaining the operating condition of the associated one of said motor units substantially constant at a condition other than said initial operating condition.

2. An apparatus as set forth in claim 1 wherein said steering control means includes first and second pumps each of which is driven by an associated one of said hydrostatic transmissions and each having a fluid output characteristic which varies as a function of variations in the output speed of the associated one of said hydrostatic transmissions, means for effecting operation of said pump controller means to vary the displacement of at least one of said pump units in response to a variation in the fluid output characteristic of one of said pumps relative to the fluid output characteristic of the other of said pumps, and selectively actuatable control means for varying the fluid output characteristic of at least one of said pumps to initiate operation of said pump controller means to vary the displacement of at least one of said pump units.

3. An apparatus as set forth in claim 1 further including control means for detecting a variation in the speed at which one of the support surface engaging drive elements of the vehicle is driven by the associated one of the hydrostatic transmissions relative to the speed at which the other of the support surface engaging drive elements of the vehicle is driven by the other hydrostatic transmission and for effecting operation of only said pump controller means to vary the displacement of one of said pump units while maintaining the operating condition of the associated one of said motor units substantially constant at a condition other than said initial operating condition.

4. An apparatus as set forth in claim 1 wherein said steering control means includes first and second pumps each of which is driven by an associated one of said hydrostatic transmissions and each having a fluid output characteristic, means for varying the fluid output characteristic of one of said pumps relative to the fluid output characteristic of the other of said pumps, comparator means for comparing the fluid output characteristics of said first and second pumps and for effecting operation of said pump controller means in response to a change in the fluid output characteristic of one of said pumps relative to the fluid output characteristic of the other of said pumps, said comparator means including valve means for connecting said pumps in fluid communication with said pump controller means.

5. An apparatus as set forth in claim 1 wherein said speed control means includes first valve means for porting a first fluid pressure to said pump and motor controller means and said steering control means includes second valve means for porting a second fluid pressure to said pump controller means and for blocking the porting of said second fluid pressure to said motor controller means.

6. An apparatus as set forth in claim 1 wherein said pump controller means includes a first pressure responsive fluid motor connected with at least one of said pump units, said motor controller means including a second pressure responsive fluid motor connected with at least one of said motor units, said speed control means including first valve means for porting control fluid pressure to said first and second pressure responsive fluid motors, said steering control means including second valve means for porting control fluid pressure to said first pressure responsive fluid motor, said second valve means being ineffective to port control fluid to said second pressure responsive motor.

7. An apparatus comprising a first hydrostatic transmission, said first hydrostatic transmission including a first pump unit, a first motor unit which is operable to rotate a first output member, and means for conducting fluid under pressure between said first pump unit and said first motor unit, first fluid pressure responsive actuator means for varying the displacement of said first pump unit in response to a change in control fluid pressure to vary the speed of rotation of said first output member, second fluid pressure responsive actuator means for varying the displacement of said first motor unit in response to a change in control fluid pressure to vary the speed of rotation of said first output member, a second hydrostatic transmission, said second hydrostatic transmission including a second pump unit, a second motor unit which is operable to rotate a second output member, and means for conducting fluid under pressure between said second pump unit and said second motor unit, third fluid pressure responsive actuator means for varying the displacement of said second pump unit in response to a change in control fluid pressure to vary the speed of rotation of said second output member, fourth fluid pressure responsive actuator means for varying the displacement of said second motor unit in response to a change in control fluid pressure to vary the speed of rotation of said second output member, pressure controller means for varying the control fluid pressure conducted to said first, second, third and fourth actuator means, a first pump driven by said first motor unit at a speed which varies with variations in the speed of rotation of said first output member, a second pump driven by said second motor unit at a speed which varies with variations in the speed of rotation of said second output member, first control means for detecting a variation in the rate at which fluid is discharged from one of said pumps relative to the rate at which fluid is discharged from the other of said pumps, for porting fluid pressure to said first actuator means to effect operation of said first actuator means to vary the displacement of said first pump unit in response to detection of a change in the rate at which fluid is discharged from said first pump relative to the rate at which fluid is discharged from said second pump, and for porting fluid pressure to said third actuator means to effect operation of said third actuator means to vary the displacement of said second pump unit in response to detection of a change in the rate at which fluid is discharged from said second pump relative to the rate at which fluid is discharged from said first pump, and means for blocking the porting fluid pressure from said first control means to said second and fourth actuator means and for enabling fluid pressure to be ported from said pressure controller means to said second and fourth actuator means.

8. An apparatus as set forth in claim 7 wherein said first actuator means includes first pressure responsive motor means for varying the displacement of said first pump unit and said third actuator means includes second pressure responsive motor means for varying the displacement of said second pump unit, said apparatus further including first fluid conduit means for conducting fluid pressure from said first control means to said first pressure responsive motor means upon detection of a change in the rate at which fluid is discharged from said first pump relative to the rate at which fluid is discharged from said second pump, and second fluid conduit means for conducting fluid pressure from said first control means to said second pressure responsive motor means upon detection of a change in the rate at which fluid is discharged from said second pump relative to the rate at which fluid is discharged from said first pump.

9. An apparatus as set forth in claim 8 further including third fluid conduit means for conducting at least a portion of a flow of fluid discharged from said first pump to said second pump and for conducting at least a portion of a flow of fluid discharged from said second pump to said first pump.

10. An apparatus as set forth in claim 7 further including second control means for varying the displacement of at least one of said pumps relative to the displacement of the other of said pumps to change the rate at which fluid is discharged from the one pump relative to the rate at which fluid is discharged from the other pump.

11. An apparatus comprising a first hydrostatic transmission, said first hydrostatic transmission including a first pump unit, a first motor unit which is operable to rotate a first output member, and means for conducting fluid between said first pump unit and said first motor unit, first actuator means for varying the displacement of said first pump unit to vary the speed of rotation of said first output member, said first actuator means being operable through a range of operating conditions between an initial condition and a fully actuated condition to vary the displacement of said first pump unit through a range of operating displacements between a minimum displacement condition and a maximum displacement condition, second actuator means for varying the displacement of said first motor unit to vary the output speed of said first output member, said second actuator means being operable through a range of operating conditions between an initial condition and a fully actuated condition to vary the displacement of said first motor unit through a range of operating displacements between a maximum displacement condition and a minimum displacement condition, first control means for effecting operation of said first and second actuator means through their range of operating conditions, and second control means operable when said first and second actuator means are in operating conditions other than said initial operating conditions to effect operation of only said first actuator means to vary the displacement of said first pump unit while maintaining the displacement of said first motor unit substantially constant.

12. An apparatus as set forth in claim 11 further including a second hydrostatic transmission, said second hydrostatic transmission including a second pump unit, a second motor unit which is operable to rotate a second output member, and means for conducting fluid between said second pump unit and second motor unit, third actuator means for varying the displacement of said second pump unit to vary the speed of rotation of said second output member, said third actuator means being operable through a range of operating conditions between an initial condition and a fully actuated condition to vary the displacement of said second pump unit through a range of operating displacements between a minimum displacement condition and a maximum displacement condition, fourth actuator means for varying the displacement of said second motor unit to vary the output speed of said second output member, said fourth actuator means being operable through a range of operating conditions between an initial condition and a fully actuated condition to vary the displacement of said second motor unit through a range of operating displacements between a maximum displacement condition and a minimum displacement condition, said first control including means for effecting operation of said third and fourth actuator means through their range of operating conditions, said second control means being operable when said third and fourth actuator means are in operating conditions other than said initial operating conditions to effect operation of said third actuator means to vary the displacement of said second pump unit while maintaining the displacement of said second motor unit substantially constant.

13. An apparatus as set forth in claim 12 wherein said first actuator means includes first fluid pressure responsive motor means for varying the displacement of said first pump unit in response to a change in control fluid pressure, said second actuator means includes second fluid pressure responsive motor means for varying the displacement of said first motor unit in response to a change in control fluid pressure, said third actuator means includes third fluid pressure responsive motor means for varying the displacement of said second pump unit in response to a change in control fluid pressure, said fourth actuator means includes fourth fluid pressure responsive motor means for varying the displacement of said second motor unit in response to a change in control pressure, said first control means including means for varying the control fluid pressure conducted to said first, second, third and fourth fluid pressure responsive motor means to effect operation of said first, second, third and fourth actuator means through their range of operating conditions, said second control means including means for varying the fluid pressure conducted to said first and third pressure responsive motor means to effect operation of only said first and third actuator means to vary the displacement of said first and second pump units while maintaining the displacement of said first and second motor units substantially constant when said second and fourth actuator means are in operating conditions other than said initial operating conditions.

14. An apparatus as set forth in claim 12 wherein said second control means includes first and second pumps each of which is driven by an associated one of said motor units and each having a fluid output characteristic which varies as a function of variations in the speed at which the associated one of said motor units rotates the associated one of said output members, first means for effecting operation of said first actuator means to vary the displacement of said first pump unit relative to the displacement of said second pump unit in response to a variation of the fluid output characteristic of one of said pumps relative to the fluid output characteristic of the other of said pumps, and second means for selectively varying the fluid output characteristic of at least one of said pumps.

* * * * *